Albert Sinclair.
Improved Mechanical Calculator.

No. 97974.

PATENTED DEC 14 1869

Witnesses.

Inventor.
Albert Sinclair
By Hopperman & Johnson.
Attorneys.

UNITED STATES PATENT OFFICE.

ALBERT SINCLAIR, OF WEST WATERVILLE, MAINE.

IMPROVEMENT IN PRICE-CALCULATING DEVICES.

Specification forming part of Letters Patent No. 97,974, dated December 14, 1869.

*To all whom it may concern:*

Be it known that I, ALBERT SINCLAIR, of West Waterville, in the county of Kennebec and State of Maine, have invented certain new and useful Improvements in Mechanical Calculators for Railroads and General Freighting Business; and I do hereby declare the following to be a full, clear, and exact description thereof, reference being had to the accompanying drawings of the same, which make part of this specification, and in which—

Figure 1:
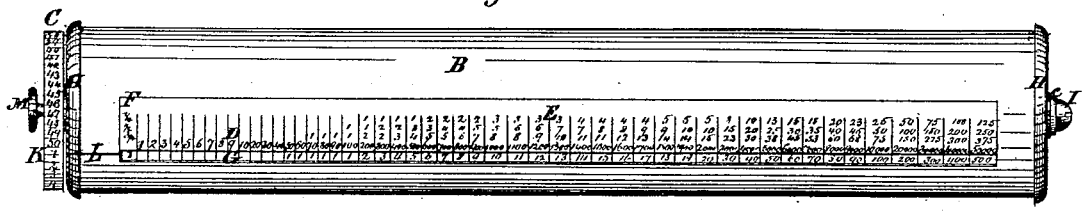
Figure 2:
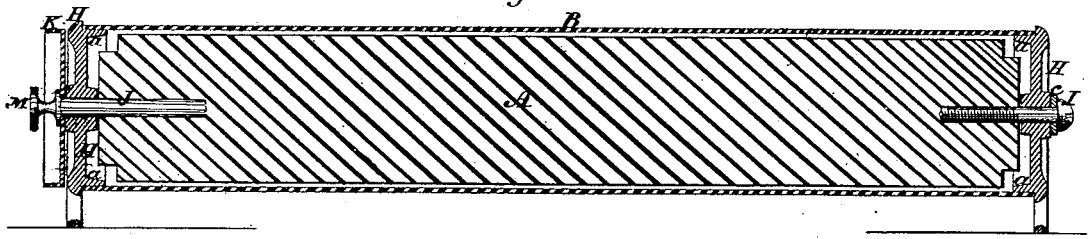
Figure 3:
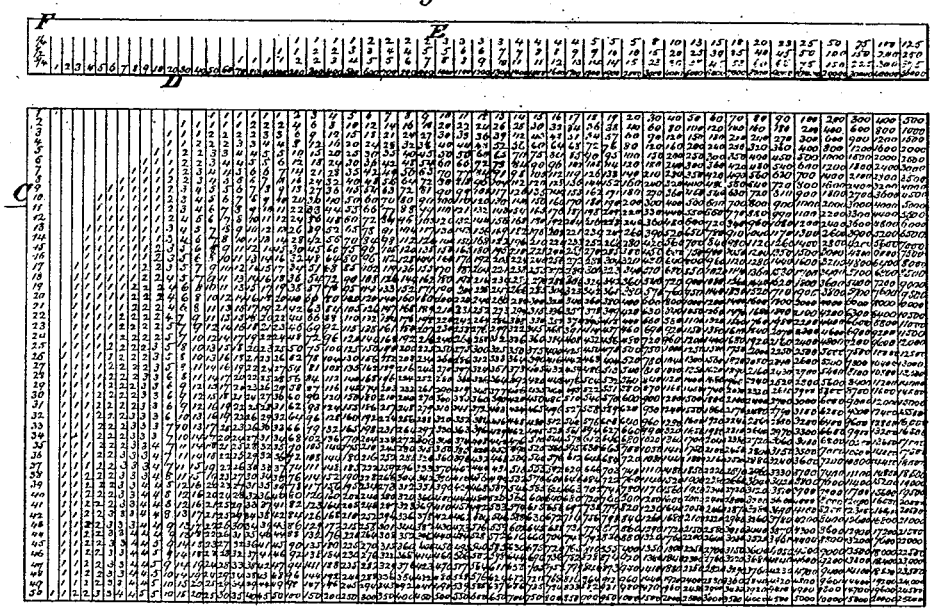

Figure 1 represents a plan or top view of a computing-machine embracing my improvements. Fig. 2 represents a vertical longitudinal section of the same. Fig. 3 represents the system of numerals upon the cylinder and the fixed case developed upon a plane.

My invention relates to determining and exhibiting charges on freights, or anything requiring calculation by mechanical means, in connection with a fixed and movable scale of figures; by which all multiplication and division of figures are dispensed with; and my improvements consist in the employment of an auxiliary revolving rate-indicator in connection with a cylinder revolved so as to expose only a line of figures at a time through a fixed opening, whereby the disadvantages of having to find and read the rating-figures through a narrow slot while the cylinder is being revolved are avoided, and the figure representing the required rate at once brought opposite the fixed opening by a quick turn of the auxiliary indicator, the rating-figures of which, being constantly exposed, serve as a guide to present to sight at once the corresponding rating-figures concealed within the case, and also as a check or guard against mistakes, which would be constantly liable to occur in reading moving numerals through a narrow fixed opening.

In the accompanying drawings, the multiplier consists, chiefly, of two parts—an interior revolving cylinder, A, and an inclosing fixed case, B—the former having a table of numerals representing charges or amounts on any given weight of freight according to any given rate, and, in connection therewith, a column of rating-numerals, C, Fig. 3, and the latter having a fixed table of numerals, D, representing pounds, and numerals E representing amounts at fractional parts of cents, which are indicated by the fractions of ¼, ½, and ¾ in the left-hand column of said table at F. The numerals on the cylinder are formed in horizontal parallel lines and separated into distinct charges or amounts by transverse parallel division-lines, as shown in Fig. 3. This table is computed from one cent to two hundred and fifty dollars, and for convenience is electrotyped and printed upon paper, which is secured to the cylinder by having its edges pasted or glued thereon, by which a surface free from wrinkles is more easily obtained. The fixed scale of numerals D is arranged adjacent to a fixed opening, G, and is graduated from one to fifty thousand pounds, and includes, also, numerals E, representing amounts at fractional parts of cents, arranged in divisions coincident with those on the cylinder. The cylinder A is fitted to turn freely within the case, and the opening G in the latter is of a width only sufficient to expose one row of numerals at a time, and is equal in length to both the fixed and movable tables. The inclosing-case B is secured at each end to a metallic head-plate, H, provided with flanges or lips a, Fig. 2, over which the cylindrical ends of the case are fitted and held securely without other fastenings, which greatly facilitates the separation of the parts to remove the cylinder, in order to remove and replace the table of numerals thereon, when, from any cause, it may become defaced or injured, and thus allow a new table to be placed upon the cylinder without having to throw away the entire machine, and for this purpose the journal of the right end of the cylinder is made by a screw, I, to admit of the ready removal of the cylinder. The head-plates H form the bearings for the journals I J of the cylinder, and also the supports for the machine, as shown in Fig. 2. The opening G in the fixed case being only wide enough to expose one line of numerals, and the rate at which the charge or amount is determined being also on the cylinder, the numeral indicating the particular rate desired must be first exposed in the narrow opening of the case; but in finding the rate it is obvious that the cylinder must be turned very slowly and carefully, in order to see when the rating-numeral is opposite the opening, and, as this operation is both inconvenient and liable to produce mistakes, I have arranged an auxiliary indicator of rates, K, at the end of the cylinder and outside of the case.

so as to expose the column of rates to full view, and thereby serve as a check and proof to the interior column of rates, C, on the cylinder, and, as an error in the rate at which the charge is made would of course produce a wrong result, it will be seen that a detector or guard against such liability is highly advantageous, and also allows the cylinder to be turned with facility and expose the right rate with absolute certainty.

The rating-numerals C in the instance represented run from 1 to 50 and correspond exactly with the rates on the cylinder, and are formed on the circumference of a disk equal in diameter to that of the cylinder, and as the fixed end of the inclosing-case intervenes between the end of the narrow opening and the said exposed auxiliary indicator a line or mark, L, is made on the case to connect the rates on the interior cylinder with those on the circumference of the disk, as shown in Fig. 1. The auxiliary indicator is secured on the left journal-bearing, and a thumb-knob, M, is also secured thereon outside of the said indicator, by which the cylinder may be turned in either direction, as may be required. The cylinder being mounted on journals, as described, it is obvious that it would be liable to turn too freely thereon, by reason of the unequal wear thereof, or from want of a proper balance of the cylinder, or from any inequality in the surface upon which the machine is placed, so that it would be necessary to hold the cylinder with one hand to maintain the proper line of numerals thereon opposite the opening in the case until the result had been taken. To obviate this great inconvenience and danger from the accidental turning of the cylinder, I intervene between the head of the clamping-screw I and the head-plate H an elastic binding-ring, c, so as to form a stop to hold the cylinder from turning when once set, and while it thus constitutes a brake to the cylinder, it will readily yield to allow it to be freely turned by the thumb and fingers. This elastic ring is not to prevent the wear of the screw, nor to make the cylinder turn more easily, but to form a brake to the motion of the cylinder.

To illustrate how the amount or charge for any given number of pounds freight is ascertained, the rate per pound being known—for example, eleven cents—the number 11 on the auxiliary indicator is turned rapidly, so as to be in line with the opening in the case, which also brings the rating-number 11 on the cylinder opposite said opening, and thus a double proof is obtained that the rate is right. The number of pounds being also known—for example, three hundred—it is only necessary to look at the number 300 on the fixed scale, which will indicate 33 on the cylinder, which will be the amount or charge in cents, and in the same manner the charge for any other number of pounds is ascertained at any other or the same rate. When fractional rates occur, all that is necessary is to compute, as before, with whole numbers, and then add the amount for the fractional rate, which is also on the fixed scale standing above the pounds in the same division-lines, which would be in the example already given—supposing the fraction to be three-fourths of a cent—two cents, which, added to the thirty-three cents already found, would make the gross amount thirty-five cents. As there are no half-pounds reckoned in railroad-freighting there is, therefore, no necessity of noting fractional parts of pounds, and hence the figures on the cylinder represent whole numbers.

The drawings represent tables of rating-numerals ranging from one-fourth of a cent to fifty; but it is obvious that the tables may be extended to double that capacity by doubling the diameters of the cylinder and rating-disk; or, the same result may be produced by using two or more cylinders of numerals within the same fixed case, in which arrangement a separate slot and fixed table would be required for each cylinder. It is also obvious that the tables may be varied to suit any particular use and calculation.

Having described my improvements, I claim—

1. The combination of an auxiliary indicator, K, with a table of rates, C, and numerals on the revolving cylinder, and the fixed opening G, and table of numerals E, of the inclosing-case B, substantially as described.

2. The cylindrical fixed slotted case B, secured to flanged head-plate H, for the purpose of facilitating the removal of the cylinder, substantially as described.

ALBERT SINCLAIR.

Witnesses:
T. H. UPPERMAN,
J. W. H. JOHNSON.